No. 700,875. Patented May 27, 1902.
D. L. WINTERS.
CLUTCH.
(Application filed Apr. 3, 1901.)
(No Model.)
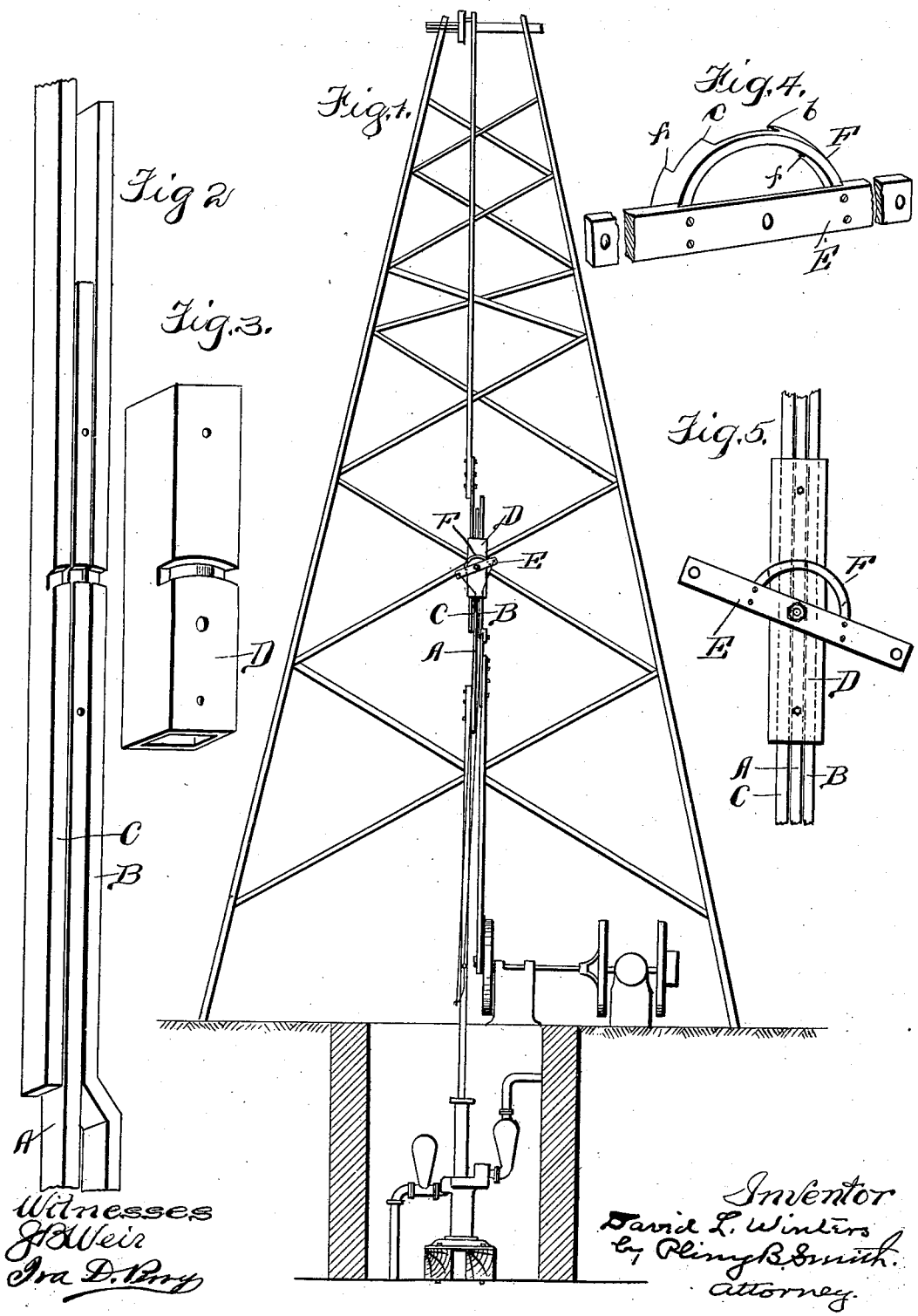

UNITED STATES PATENT OFFICE.

DAVID L. WINTERS, OF CHICAGO, ILLINOIS, ASSIGNOR TO THEODORE WILBUR SNOW, OF BATAVIA, ILLINOIS.

CLUTCH.

SPECIFICATION forming part of Letters Patent No. 700,875, dated May 27, 1902.

Application filed April 3, 1901. Serial No. 54,222. (No model.)

*To all whom it may concern:*

Be it known that I, DAVID L. WINTERS, a citizen of the United States, residing in the city of Chicago, county of Cook, and State of Illinois, have invented a new and useful Improvement in Clutches, of which the following is a specification.

My invention relates to mechanisms to which a reciprocating motion is imparted by either of several interchangeable motor powers.

The object of my improvement is to provide a clutch by which a piston or other reciprocating rod to which motion is imparted may be alternatively locked to a pitman or reciprocating rod of either of several motors, as circumstances may require, and the change from one to the other power be made easily and expeditiously. The drawings represent the rod to which the power is applied as the piston-rod of a pump and the motor-rods as the pitmen of a windmill and a steam or gas engine, respectively. I attain these objects by the mechanism illustrated in the accompanyings drawings, in which—

Figure 1 is a comprehensive view of a pump, windmill, and engine equipped with the clutch or interlocking device. Fig. 2 shows the piston-rod of the pump and the pitmen of the windmill and engine in the position for the application of the clutch. Fig. 3 is the shell which cases the pitmen and rod forming a guide and keeping them in proper lateral relation and also forms part of the locking device. Fig. 4 is a perspective view of the lever of the locking device provided with the locking jaws or bolts; and Fig. 5 shows the complete clutch in position locking the piston-rod and the pitman of the windmill together, leaving the engine-pitman idle.

Similar letters refer to similar parts throughout the several views.

A is the piston-rod of the pump, C is the pitman of the windmill, and B is the pitman of the engine, each being provided with a transverse slot or notch for the reception and engagement of the jaws or bolts of the locking device. These slots should be so formed that when in coincidence they will form an arc corresponding to the locking jaws or bolts.

The casing or guide D is bolted to the piston-rod A, the transverse slot with which it is provided being in coincidence with the slot on the rod. The transverse slot of the guide D is an arc corresponding to the locking-jaws. The pitmen B and C play freely through the guide when not locked by the clutch.

E is a lever pivoted at its center to the shell or guide D and piston-rod A. The lever has secured to and forming a part thereof the semicircular yoke or bow F, which is provided with the jaws *b* and *c*, which form the locking-bolts. Each jaw of the bolt is provided with the shoulder *f* (seen in Fig. 4) and which strikes against the shell D, limiting the motion of the lever. The yoke in lateral section projects at right angles from the plane of the lever and is broad enough to project through the slot of the shell D into the slots of the rods and pitmen. Holes are provided in each end of the lever E, in which ropes are secured for the purpose of controlling and operating the lever.

When it is desired to operate the pump by the power of the windmill, the right-hand end of the lever E is depressed by means of the rope. The other end of the lever is thus raised, and the jaw *c*, moving through the transverse slot in the casing, enters the slot in the pitman C of the windmill and piston-rod, the shoulder *f* of the yoke striking the shell or casing when the jaw *c* has completely engaged the rod A, as shown in Fig. 5. The windmill-pitman and the piston-rod are thus securely locked together, and the motion of the windmill imparts motion to the pump, while the distance between the jaws *b* and *c* is such that when the lever is in the position just described the jaw *b* is entirely disengaged from the pitman B, and consequently the shell or guide D while in motion plays freely up and down on the pitman B, which remains stationary. The reverse movement of the lever disengages the jaw *c* from the slots in the windmill-pitman and the piston-rod of the pump, while the jaw B, entering the notches or slots in the pitman B and rod A, firmly locks them together, as shown in Fig. 1, and the engine in turn imparts motion to the pump, the pitman C remaining stationary.

It is obvious that a guide could be made in other forms than the solid casing D and the lever E pivoted directly upon the rod A, and the same would be the equivalent of the construction shown.

What I claim as my invention, and desire to secure by Letters Patent, is—

1. In a clutch the combination of the guide D and the lever E carrying the yoke F provided with the jaws $b$ and $c$ with the piston A and the pitmen B and C provided with slots or notches substantially as described.

2. In a clutch the combination of the guide D and the lever E provided with the jaws $b$ and $c$ and the stops $ff$ with the piston A and the pitmen B and C provided with slots or notches substantially as described.

DAVID L. WINTERS.

Witnesses:
ALBERT F. OLSON,
HELEN BARRY.